US007834846B1

(12) United States Patent
Bell

(10) Patent No.: US 7,834,846 B1
(45) Date of Patent: Nov. 16, 2010

(54) INTERACTIVE VIDEO DISPLAY SYSTEM

(76) Inventor: Matthew Bell, 4245 Los Palos Ave., Palo Alto, CA (US) 94309

( * ) Notice: Subject to any disclaimer, the term of this patent is extended or adjusted under 35 U.S.C. 154(b) by 0 days.

(21) Appl. No.: 11/507,976

(22) Filed: Aug. 21, 2006

Related U.S. Application Data

(62) Division of application No. 10/160,217, filed on May 28, 2002, now Pat. No. 7,259,747.

(60) Provisional application No. 60/296,189, filed on Jun. 5, 2001.

(51) Int. Cl.
G09G 5/00 (2006.01)
(52) U.S. Cl. ...................... 345/156; 345/158
(58) Field of Classification Search ......... 345/156–163, 345/418–428, 469–475, 173–179; 463/30–40
See application file for complete search history.

(56) References Cited

U.S. PATENT DOCUMENTS

| 4,573,191 | A | 2/1986 | Kidode et al. |
| 4,725,863 | A | 2/1988 | Dumbreck et al. |
| 4,843,568 | A | 6/1989 | Krueger et al. |
| 4,887,898 | A | 12/1989 | Halliburton et al. |
| 4,948,371 | A | 8/1990 | Hall |
| 5,001,558 | A | 3/1991 | Burley et al. |
| 5,138,304 | A | 8/1992 | Bronson |
| 5,239,373 | A | 8/1993 | Tang et al. |
| 5,276,609 | A | 1/1994 | Durlach |
| 5,325,472 | A | 6/1994 | Horiuchi et al. |
| 5,325,473 | A | 6/1994 | Monroe et al. |
| 5,426,474 | A | 6/1995 | Rubtsov et al. |
| 5,436,639 | A | 7/1995 | Arai et al. |
| 5,510,828 | A | 4/1996 | Lutterbach et al. |

(Continued)

FOREIGN PATENT DOCUMENTS

EP 0055366 A2 7/1982

(Continued)

OTHER PUBLICATIONS

U.S. Appl. No. 10/160,217, Matthew Bell, Interactive Video Display System, filed May 28, 2002.

(Continued)

Primary Examiner—Vijay Shankar
(74) Attorney, Agent, or Firm—Knobbe Martens Olson & Bear, LLP

(57) ABSTRACT

A device allows easy and unencumbered interaction between a person and a computer display system using the person's (or another object's) movement and position as input to the computer. In some configurations, the display can be projected around the user so that that the person's actions are displayed around them. The video camera and projector operate on different wavelengths so that they do not interfere with each other. Uses for such a device include, but are not limited to, interactive lighting effects for people at clubs or events, interactive advertising displays, etc. Computer-generated characters and virtual objects can be made to react to the movements of passers-by, generate interactive ambient lighting for social spaces such as restaurants, lobbies and parks, video game systems and create interactive information spaces and art installations. Patterned illumination and brightness and gradient processing can be used to improve the ability to detect an object against a background of video images.

32 Claims, 7 Drawing Sheets

U.S. PATENT DOCUMENTS

| | | | |
|---|---|---|---|
| 5,528,263 A | 6/1996 | Platzker et al. | |
| 5,528,297 A | 6/1996 | Seegert et al. | |
| 5,534,917 A | 7/1996 | MacDougall | |
| 5,548,694 A | 8/1996 | Gibson | |
| 5,591,972 A | 1/1997 | Noble et al. | |
| 5,633,691 A | 5/1997 | Vogeley et al. | |
| 5,703,637 A | 12/1997 | Miyazaki et al. | |
| 5,861,881 A | 1/1999 | Freeman et al. | |
| 5,882,204 A | 3/1999 | Iannazo et al. | |
| 5,923,380 A | 7/1999 | Yang | |
| 5,953,152 A | 9/1999 | Hewlett | |
| 5,969,754 A | 10/1999 | Zeman | |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao et al. | |
| 6,084,979 A | 7/2000 | Kanada et al. | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A * | 9/2000 | Onda | 382/154 |
| 6,166,744 A | 12/2000 | Jaszlics et al. | |
| 6,176,782 B1 | 1/2001 | Lyons et al. | |
| 6,198,487 B1 | 3/2001 | Fortenbery et al. | |
| 6,198,844 B1 | 3/2001 | Nomura | |
| 6,263,339 B1 | 7/2001 | Hirsh | |
| 6,292,171 B1 | 9/2001 | Fu et al. | |
| 6,308,565 B1 | 10/2001 | French et al. | |
| 6,333,735 B1 | 12/2001 | Anvekar | |
| 6,335,977 B1 | 1/2002 | Kage | |
| 6,339,748 B1 | 1/2002 | Hiramatsu | |
| 6,349,301 B1 | 2/2002 | Mitchell et al. | |
| 6,353,428 B1 | 3/2002 | Maggioni et al. | |
| 6,359,612 B1 | 3/2002 | Peter et al. | |
| 6,388,657 B1 | 5/2002 | Natoli | |
| 6,400,374 B2 | 6/2002 | Lanier | |
| 6,414,672 B2 | 7/2002 | Rekimoto et al. | |
| 6,454,419 B2 | 9/2002 | Kitazawa | |
| 6,501,515 B1 | 12/2002 | Iwamura | |
| 6,545,706 B1 | 4/2003 | Edwards et al. | |
| 6,598,978 B2 | 7/2003 | Hasegawa | |
| 6,607,275 B1 | 8/2003 | Cimini et al. | |
| 6,611,241 B1 | 8/2003 | Firester | |
| 6,654,734 B1 | 11/2003 | Mani et al. | |
| 6,658,150 B2 | 12/2003 | Tsuji et al. | |
| 6,661,918 B1 * | 12/2003 | Gordon et al. | 382/173 |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 * | 4/2004 | Pryor et al. | 345/158 |
| 6,747,666 B2 | 6/2004 | Utterback et al. | |
| 6,754,370 B1 | 6/2004 | Hall-Holt et al. | |
| 6,791,700 B2 | 9/2004 | Omura et al. | |
| 6,826,727 B1 | 11/2004 | Mohr et al. | |
| 6,831,664 B2 | 12/2004 | Marmaropoulos et al. | |
| 6,912,313 B2 | 6/2005 | Li | |
| 6,971,700 B2 | 12/2005 | Blanger et al. | |
| 6,975,360 B2 | 12/2005 | Slatter | |
| 6,999,600 B2 | 2/2006 | Venetianer | |
| 7,015,894 B2 | 3/2006 | Morohoshi | |
| 7,042,440 B2 | 5/2006 | Pryor | |
| 7,068,274 B2 | 6/2006 | Welch et al. | |
| 7,069,516 B2 | 6/2006 | Rekimoto | |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,330,584 B2 | 2/2008 | Weiguo et al. | |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,536,032 B2 | 5/2009 | Bell | |
| 7,576,727 B2 | 8/2009 | Bell | |
| 2001/0012001 A1 | 8/2001 | Rekimoto et al. | |
| 2001/0033675 A1 * | 10/2001 | Maurer et al. | 382/103 |
| 2002/0032697 A1 | 3/2002 | French et al. | |
| 2002/0041327 A1 * | 4/2002 | Hildreth et al. | 348/42 |
| 2002/0064382 A1 | 5/2002 | Hildreth et al. | |
| 2002/0103617 A1 | 8/2002 | Uchiyama et al. | |
| 2002/0105623 A1 | 8/2002 | Pinhanez | |
| 2002/0130839 A1 | 9/2002 | Wallace et al. | |
| 2002/0178440 A1 | 11/2002 | Agnihotri et al. | |
| 2002/0186221 A1 | 12/2002 | Bell | |
| 2003/0091724 A1 | 5/2003 | Mizoguchi | |
| 2003/0093784 A1 | 5/2003 | Dimitrova et al. | |
| 2003/0098819 A1 | 5/2003 | Sukthankar et al. | |
| 2003/0113018 A1 | 6/2003 | Nefian et al. | |
| 2003/0122839 A1 | 7/2003 | Matraszek et al. | |
| 2003/0161502 A1 | 8/2003 | Morihara et al. | |
| 2003/0178549 A1 | 9/2003 | Ray | |
| 2004/0015783 A1 | 1/2004 | Lennon et al. | |
| 2004/0046736 A1 * | 3/2004 | Pryor et al. | 345/156 |
| 2004/0046744 A1 | 3/2004 | Rafii et al. | |
| 2004/0073541 A1 | 4/2004 | Lindblad et al. | |
| 2004/0183775 A1 | 9/2004 | Bell | |
| 2005/0088407 A1 | 4/2005 | Bell | |
| 2005/0089194 A1 | 4/2005 | Bell | |
| 2005/0110964 A1 | 5/2005 | Bell et al. | |
| 2005/0122308 A1 | 6/2005 | Bell | |
| 2005/0132266 A1 | 6/2005 | Ambrosino et al. | |
| 2005/0162381 A1 | 7/2005 | Bell | |
| 2005/0185828 A1 | 8/2005 | Semba et al. | |
| 2005/0265587 A1 | 12/2005 | Schneider | |
| 2006/0132432 A1 | 6/2006 | Bell | |
| 2006/0168515 A1 | 7/2006 | Dorsett, Jr. et al. | |
| 2006/0184993 A1 | 8/2006 | Goldthwaite et al. | |
| 2006/0227099 A1 | 10/2006 | Han et al. | |
| 2006/0242145 A1 | 10/2006 | Krishnamurthy et al. | |
| 2006/0256382 A1 | 11/2006 | Matraszek et al. | |
| 2008/0062123 A1 | 3/2008 | Bell | |
| 2008/0150890 A1 | 6/2008 | Bell et al. | |
| 2008/0150913 A1 | 6/2008 | Bell et al. | |
| 2008/0252596 A1 | 10/2008 | Bell et al. | |
| 2009/0077504 A1 | 3/2009 | Bell et al. | |
| 2009/0225196 A1 | 9/2009 | Bell et al. | |
| 2009/0235295 A1 | 9/2009 | Bell et al. | |
| 2009/0251685 A1 | 10/2009 | Bell et al. | |
| 2010/0026624 A1 | 2/2010 | Bell et al. | |
| 2010/0039500 A1 | 2/2010 | Bell et al. | |
| 2010/0060722 A1 | 3/2010 | Bell et al. | |

FOREIGN PATENT DOCUMENTS

| | | |
|---|---|---|
| EP | 0626636 A2 | 11/1994 |
| EP | 0913790 A1 | 5/1999 |
| EP | 1 689 172 A1 | 8/2006 |
| JP | 57094672 | 6/1982 |
| WO | WO 98/38533 A | 9/1998 |
| WO | WO9838533 | 9/1998 |
| WO | WO 00/16562 | 3/2000 |
| WO | WO/01/63916 | 8/2001 |
| WO | WO 2002/100094 A2 | 12/2002 |
| WO | WO 2004/055776 | 7/2004 |
| WO | WO 2004/097741 A1 | 11/2004 |
| WO | WO 2005/041578 A2 | 5/2005 |
| WO | WO 2005/041579 A3 | 5/2005 |

| | | |
|---|---|---|
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

U.S. Appl. No. 10/737,730, Matthew Bell, Interactive Directed Light/Sound System, filed Dec. 15, 2003.

U.S. Appl. No. 10/974,044, Matthew Bell, Method and System for Processing Captured Image Information in an Interactive Video Display System, filed Oct. 25, 2004.

U.S. Appl. No. 10/973,335, Matthew Bell, Method and System for Managing an Interactive Video Display System, filed Oct. 25, 2004.

U.S. Appl. No. 10/866,495, Tipatat Chennavasin, Interactive Display System for Generating Images for Projection onto a Three-Dimensional Object, filed Jun. 10, 2004.

U.S. Appl. No. 10/946,263, Matthew Bell, Self-Contained Interactive Video Display System, filed Sep. 20, 2004.

U.S. Appl. No. 10/946,084, Matthew Bell, Self-Contained Interactive Video Display system, filed Sep. 20, 2004.

U.S. Appl. No. 10/946,414, Matthew Bell, Interactive Video Window Display System, filed Sep. 20, 2004.

U.S. Appl. No. 11/197,941, Matthew Bell, Interactive Video Display System, filed Aug. 5, 2005.

U.S. Appl. No. 11/106,898, Malik Coates, Method and System for State-Based Control of Objects, filed Apr. 15, 2005.

U.S. Appl. No. 11/142,202, Matthew T. Bell, System and Method for Sensing a Feature of an Object in an Interactive Video Display, filed May 31, 2005.

U.S. Appl. No. 11/142,115, Steve Fink, Method and System for Combining Nodes into a Mega-Node, filed May 31, 2005.

U.S. Appl. No. 11/106,184, Matthew T. Bell, Method and System for Glare Resist Processing in an Interactive Video Display System, filed Apr. 14, 2005.

U.S. Appl. No. 11/101,900, John Paul D'India Interactive Display System with Fluid Motion Visual Effect Capability, filed Apr. 8, 2005.

U.S. Appl. No. 11/634,044, Matthew Bell, Systems and Methods for Communication Between a Reactive Video System and a Mobile Communication Device, filed Dec. 4, 2006.

"Bodymover Body Movement as a Means to Obtain an Audiovisual Spatial Experience" 2000 ART+COM AG Berlin; <http://www.artcome/de/index.php?option=com_acprojects&page=6&id=28&Itemid=144&details=0&lang=en>.

"Supreme Particles; R111," 1999, available online at <http://www.r111.org>, XP-002989704.

International Preliminary Report on Patentability for PCT/US2006/030720, filed on Aug. 4, 2006.

International Search Report for PCT/US2006/030720, filed Aug. 4, 2006.

Written Opinion of the International Searching Authority for PCT/US2006/030720, filed Aug. 4, 2006.

ART+COM Bodymover 2000, as downloaded on Aug. 21, 2009 from <http://www.artcom.de/index/php?option=com_acprojects&page=6&id=28&Itemid=144&details=0&lang=en>, cited during opposition of EP Appln. No. 02739710.8, filed Jun. 4, 2002.

ARTCOM: "Projekt Bodymover 2000; Koerperbewegung als Mittel zur Schaffung eines audio-visuellen Raum-Erlenbisses" <URL:HTTP://ARTCOM.DE/IMAGES/STORIES/2_PRO_BODYMOVER/BODYMOVERD.PDF>, 2000, XP002989289, English translation submitted (No. 92 on IDS).

Communication dated Dec. 2, 2008 from Patentanwalt attaching article by Katy Bachman, entitled "Reactrix Up for Sale," cited during opposition of EP Appln. No. 02739710.8, filed Jun. 4, 2002.

EffecTV Software Source: effect module, dated May 20, 2001 (German); cited during opposition of EP Appln. No. 02739710.8, filed Jun. 4, 2002.

Livingston, Mark Alan, "Vision-based Tracking with Dynamic Structured Light for Video See-through Augmented Reality," 1998, Ph.D. Dissertation, University of North Carolina at Chapel Hill.

Morano, Raymond A., et al., "Structured Light Using Pseudorandom Codes," Mar. 1998, IEEE Transactions on Pattern Analysis and Machine Intelligence, vol. 20, No. 3.

International Search Report for PCT/US2005/008984, filed Mar. 18, 2005.

Written Opinion of the International Searching Authority for PCT/US2004/041318, filed Dec. 9, 2004.

Affidavit of Daniel Barthels regarding EffecTV, dated May 15, 2007 (partial machine translation), cited during opposition of EP Appln. No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of EP Appln. No. 02739710.8, filed Jun. 4, 2002.

International Preliminary Report on Patentability for PCT/US2004/041318, filed Dec. 9, 2004.

International Search Report for PCT/US2002/017843, filed Jun. 4, 2002.

Letter dated May 16, 2007 from Christian Zuckschwerdt regarding EffecTV, (partial machine translation), cited during opposition of EP Appln. No. 02739710.8, filed Jun. 4, 2002.

Notice of Opposition in European Appln. No. 02739710.8 dated May 14, 2007.

Official Communication in European Appln. No. 2002312346 dated Nov. 14, 2006.

PLASMA; 3 pages; <http://www.particles.de/paradocs/plasma/index.html>, cited in U.S. Appl. No. 10/160,217, filed Aug. 8, 2005.

Screenshots of Reactrix Product Demo Video, Mar. 28, 2003, <http://web.archive.org/web/20030407174258/http://www.reactrix.com/demo/reactrix_demo.wmv>.

Written Opinion of the International Searching Authority for PCT/US2004/041319, filed Dec. 9, 2004.

Written Opinion of the International Searching Authority for PCT/US2005/008984, filed Mar. 18, 2005.

Article 96(2) Communication dated Feb. 25, 2005 in European Appln. No. 02739710.8.

Article 96(2) Communication dated Mar. 31, 2004 in European Appln. No. 02739710.8.

International Preliminary Report on Patentability and Written Opinion for PCT/US2004/041320, filed Dec. 9, 2004.

International Search Report for PCT/US2004/041319, filed Dec. 9, 2004.

Jabri, Sumer et al., "Detection and Location of People in Video Images Using Adaptive Fusion of Color and Edge Information:" presented at the Int. Conf. Pattern Recognition, Barcelona, Spain, 2000.

Observation by third party Simon Penny dated Jan. 4, 2005, cited during opposition of EP Appln. No. 02739710.8, filed Jun. 4, 2002.

International Search Report for PCT/US03/40321, filed Dec. 15, 2003.

Official Communication in Chinese Appln. No. 02815206.9 dated Dec. 12, 2008.

Frisken, Sarah F. et al., "Adaptively Sampled Distance Fields: A General Representation of Shape for Computer Graphics," 2000, Proc. Of the 27th Annual Conf. on Computer Graphics and Interactive Techniques, pp. 249-254.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of EP Appln. No. 02739710.8, filed Jun. 4, 2002.

International Preliminary Report on Patentability for PCT/US2005/008984, filed Mar. 18, 2005.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Written Opinion of the International Searching Authority for PCT/US2004/035477, filed Oct. 25, 2004.

International Preliminary Examination Report for PCT/US2002/017843, filed Jun. 4, 2002.
Written Opinion of the International Searching Authority for PCT/US2004/035478, filed Oct. 25, 2004.
International Preliminary Report on Patentability for PCT/US2004/035478, filed Oct. 25, 2004.
International Preliminary Report on Patentability for PCT/US2004/041319, filed Dec. 9, 2004.
International Search Report for PCT/US2004/041320, filed Dec. 9, 2004.
International Search Report for PCT/US2008/059900, filed Apr. 10, 2008.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
International Search Report for PCT/US2008/10750, filed Sep. 15, 2008.
Goetz, Frank, et al., "An XML-based Visual Shading Language for Vertex and Fragment Shaders," 3D Technologies for the World Wide Web, Proceedings of Ninth International Conference on 3D Technology; ACM—2004; pp. 87-97.
International Preliminary Report on Patentability for PCT/US2004/035477, filed Oct. 25, 2004.
International Search Report for PCT/US2004/035477, filed Oct. 25, 2004.
Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.
Schneider, John K., "Improved Fingerprint System Using Rolled and Multi-segmented Techniques," U.S. Appl. No. 60/575,952, filed Jun. 1, 2004, pp. 1-6.
Tan, P, et al., "Highlight Removal by Illumination-Constrained Inpainting," Ninth IEEE International Conference on Computer Vision, 2003.
Toth, Daniel et al., "Illumination-Invariant Change Detection," 2000 4th IEEE Southwest Symposium on Image Analysis and Interpretation, p. 3.
Hoff, Kenneth E. III, et al, "Fast and Simple 2D Geometric Proximity Queries Using Graphics Hardware," 2001, Proc. Of the 2001 Symposium on Interactive 3D Graphics, pp. 145-148.
Crouser, P.D., et al., "Unattenuated tracer particle extraction through time-averaged, background image subtraction with outlier rejection," Experiments in Fluids, 22, 1997, 220-228, Springer-Verlag.
Krueger, Myron, et al., "Videoplace—An Artificial Reality," Apr. 1985, Conference on Human Factors in Computing Systems, San Francisco, California, pp. 35-40.
Official Communication in Chinese Appln. No. 200480030951.8 dated Mar. 27, 2009.
Official Communication in Chinese Appln. No. 200480034551.4 dated May 19, 2008.
Sato, Yoichi et al., "Fast Tracking of Hands and Fingertips in Infrared Images for Augmented Desk Interface," Mar. 2000, 4th International Conference on Automatic Face -and Gesture-Recognition, Grenoble, France.
Vogt, Florian et al., "Highlight Substitution in Light Fields," IEEE International Conference on Image Processing 2002.
Wang, Junxian, et al., "Specular reflection removal for human detection under aquatic environment," 2004 IEEE Conference on Computer and Pattern Recognition Workshop (CVPRW04) vol. 8, p. 130.
Lantagne, Michel, et al., "VIP: Vision tool for comparing Images of People," Vision Interface 2003, pp. 1-8.
Sonneck, Georg, et al., "Optimized One-to-One Personalization of Web Applications using a Graph Based Model," IEEE-22, Apr. 26, 2003, 9 pgs.
Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM-2002, pp. 155-163.
Written Opinion of the International Searching Authority for PCT/US2004/041320, filed Dec. 9, 2004.

International Search Report for PCT/US2004/041318, filed Dec. 9, 2004.
Joyce, Arthur W. III, et al., "Implementation and capabilities of a virtual interaction system," 1998, Proc. 2nd Euro. Conf. Disability, Virtual Reality & Assoc. Tech., Skovde, Sweden, pp. 237-245.
Brown, Matthew, et al. "Multi-Image Matching using Multi-Scale Oriented Patches" Technical Report, Dec. 2004, pp. 1-48, available online at <ftp://ftp.research.microsoft.com/pub/tr/TR-2004-133.pdf>.
Brown, Matthew, et al., "Multi-Image Matching using Multi-Scale Oriented Patches" Proceedings of the 2005 IEEE Computer Society Conference on Computer Vision and Pattern Recognition, Conference Publication Date: Jun. 20-25, 2005, 8 pgs.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Extended Search Report for EP 06010825.5, filed Jun. 4, 2002.
International Search Report for PCT/US2004/035478, filed Oct. 25, 2004.
Rekimoto, J. and Matsushita, N., "Perceptual Surfaces: Towards a Human and Object Sensitive Interactive Display," 1997, Proc. of the Workshop on Perceptual User Interfaces, Banff, Canada, pp. 30-32.
Pinhanez, C., "The Everywhere Displays Projector: A Device to Create Ubiquitous Graphical Interfaces," 2001, Proc. of the UbiComp 2001 Conference, Ubiquitous Computing Lecture Notes in Computer Science, Springer-Verlag, Berlin, Germany, pp. 315-331.
Kjeldsen, R. et al., "Interacting with Steerable Projected Displays," 2002, Proc. of the 5th International Conference on Automatic Face and Gesture Recognition, Washington, D.C.
Pinhanez, C. et al., "Ubiquitous Interactive Graphics," 2002, IBM Research Report RC22495, available at <http://www.research.ibm.com/ed/publications/rc22495.pdf>.
Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.
Sparacino, Flavia et al., "Media in performance: interactive spaces for dance, theater, circus and museum exhibits," 2000, IBM Systems Journal, vol. 39, No. 3-4, pp. 479-510.
Sparacino, Flavia, "(Some) computer vision based interfaces for interactive art and entertainment installations," 2001, INTER_FACE Body Boundaries, Anomalie digital_arts, No. 2, Paris, France.
Leibe, Bastian et al., "Toward Spontaneous Interaction with the Perceptive Workbench, a Semi-Immersive Virtual Environment," Nov./Dec. 2000, IEEE Computer Graphics and Applications, vol. 20, No. 6, pp. 54-65.
Davis, J.W. and Bobick, A.F., "SIDEshow: A Silhouette-based Interactive Dual-screen Environment," Aug. 1998, MIT Media Lab Tech Report No. 457.
Paradiso, Joseph et al., "New Sensor and Music Systems for Large Interactive Surfaces," 2000, Proc. of the Interactive Computer Music Conference, Berlin, Germany, pp. 277-280.
Freeman, William et al., "Computer vision for interactive computer graphics," May-Jun. 1998, IEEE Computer Graphics and Applications, vol. 18, No. 3, pp. 41-53.
GroundFX Document, GestureTek (Very Vivid, Inc.), description available online at <http://www.gesturetek.com/groundfx>, downloaded Aug. 11, 2006.
Keays, Bill, "Using High-Bandwidth Input/Output in Interactive Art," Jun. 1999, Master's Thesis, Massachusetts Institute of Technology, School of Architecture and Planning.
Utterback, Camille and Achituv, Romy, "Text Rain," 1999, art installation, available online at <http://www.camilleutterback.com/textrain.html>.
Muench, Wolfgang, "Bubbles", 1999, Prix Ars Electronica Catalog 1999, Springer-Verlag, Berlin, Germany; available online at <http://hosting.zkm.de/wmuench/bub/text>.
Demarest, Ken, "Sand," 2000, Mine Control, art installation, available online at <http://www.mine-control.com>.
Sester, Marie, "Access," 2001, Interaction '99 Biennial Catalog, Gifu, Japan, available online at <http://www.accessproject.net/concept.html>.

Wellner, Pierre, "Interacting with paper on the DigitalDesk," Jul. 1993, Communications of the ACM, Special issue on computer augmented environments: back to the real world, vol. 36, Issue 7, pp. 87-96.

Foerterer, Holger, "Fluidum," 1999, art installation, description available online at <http://www.foerterer.com/fluidum>.

Trefzger, Petra, "Vorwerk," 2000, art installation, description available online at <http://www.petracolor.de>.

Foeterer, Holger, "Helikopter," 2001, art installation, description available online at <http://www.foerterer.com/helikopter>.

Mandala Systems, "Video Gesture Control System Concept," 1986, description available online at <http://www.vividgroup.com/tech.html>.

Kreuger, Myron, "Videoplace," 1969 and subsequent, summary available online at <http://www.jtnimoy.com/itp/newmediahistory/videoplace>.

Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.

Fujihata, Masaki, "Beyond Pages," 1995, art installation, description available online at <http://http://on1.zkm.de/zkm/werke/BeyondPages>.

Rogala, Miroslav, "Lovers Leap," 1994, art installation, Dutch Electronic Arts Festival, description available online at <http://http://wayback.v2.nl/DEAF/persona/rogala.html>.

Snibbe, Scott, "Boundary Functions," 1998, art installation, description available online at <http://snibbe.com/scott/bf/index.htm>.

Snibbe, Scott, "Screen Series," 2002-2003, art installation, description available online at <http://snibbe.com/scott/screen/index.html>.

Keays, Bill, "metaField Maze," 1998, exhibited at Siggraph'99 Emerging Technologies and Ars Electronica 1999, description available online at <http://www.billkeays.com/metaFieldInfosheet1A.pdf>.

Hemmer, Raphael Lozano, "Body Movies," 2002, art project/installation, description available online at <http://www.lozano-hemmer.com/eproyecto.html>.

Penny, Simon et al., "Body Electric," 2003, art installation, description available online at <http://www.neuromech.northwestern.edu/uropatagium/#ArtSci>.

Penny, Simon and Bernhardt, Andre, "Fugitive II," 2004, Australian Center for the Moving Image, art installation, description available online at <http://www.acmi.net.au/fugitive.jsp?>.

Elgammal, Ahmed et al., "Non-parametric Model for Background Subtraction," Jun. 2000, European Conference on Computer Vision, Lecture Notes on Computer Science, vol. 1843, pp.

Lamarre, Mathieu and James J. Clark, "Background subtraction using competing models in the block-DCT domain," 2002, IEEE Comput Soc US, vol. 1, pp. 299-302.

Stauffer, Chris and W. Eric L. Grimson, "Learning Patterns of Activity Using Real-Time Tracking," Aug. 2000, IEEE Transaction on Pattern Analysis and Machine Intelligence, vol. 22, No. 8, pp. 747-757.

Harville, Michael et al., "Foreground Segmentation Using Adaptive Mixture Models in Color and Depth," 2001, Proc. of IEE Workshop on Detection and Recognition of Events in Video, pp. 3-11.

Kurapati, Kaushal et al., "A Multi-Agent TV Recommender," 2001, Workshop on Personalization in Future TV, pp. 1-8, XP02228385.

"EffecTV" Version 0.2.0 released Mar. 27, 2001, available online at <http://web.archive.org/web/20010101-20010625re_http://effectv.sourceforge.net>.

"Index of /EffecTV," available online at <http://effectv.cvs.sourceforge.net/effectv/EffecTV/?pathrev=rel_0_2_0>, downloaded Apr. 30, 2007.

Penny et al., "Traces: Wireless full body tracking in the CAVE," Dec. 1999, ICAT Virtual Reality Conference, Japan.

Penny, Simon, "Fugitive," 1995-1997, available online at <http://ace.uci.edu/penny/works/fugitive.html>.

Supreme Particles, "Plasma/Architexture," 1994, available online at <http://www.particles.de/paradocs/plasma/index.html>.

Khan, Jeff, "Intelligent room with a view," Apr.-May 2004, RealTime Arts Magazine, Issue 60, available online at <http://www.realtimearts.net/article/60/7432>.

"R111, the transformation from digital information to analog matter," available online at <http://www.particles.de/paradocs/r111/10mkp2004/html/r111_text111hoch04.html>.

http://www.r111.org, R111, Supreme Particles 1999.

Korperbewgung, Bodymover, 2000.

Bodymover, 2000, DaimlerChrysler AG.

European Search Report, Application No. 06010825.5-2202, Jul. 6, 2006.

Buxton, Bill, "Multi-Touch Systems That I Have Known and Loved," accessed Mar. 21, 2007, http://billbuxton.com/multitouchOverview.html.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," 2005, ACM Symposium on User Interface Software and Technology (UIST).

Invitation to Pay Additional Fees and Partial International Search Report on Patentability for PCT/US2004/035478, filed Oct. 25, 2004.

Katz, Itai et al., "A Multi-Touch Surface Using Multiple Cameras," 2007, Advanced Concepts for Intelligent Vision Systems, vol. 4678/2007.

Kjeldesn, Rick et al., "Dynamically Reconfigurable Vision-Based User Interfaces," Apr. 2003, 3rd International Conference on Vision Systems (ICVVS '03), Graz, Austria, pp. 6-12.

Levin, Golan "Computer Vision for Artists and Designers: Pedagogic Tools and Techniques for Novice Programmers," Aug. 2006, AI & Society, vol. 20, Issue 4, pp. 462-482.

Malik, Shahzad et al., "Visual Touchpad: A Two-Handed Gestural Input Device," Oct. 13-15, 2004, International Conference on Multimodal Interfaces (ICMI '04).

MacIver, Malcolm, et al., "Body Electric," 2003, art installation, description available online at <http://www.neuromech.northwestern.edu/uropatagium/#ArtSci>.

Microsoft Surface multi-touch interface table unveiled, May 30, 2007, downloaded from http://www.dancewithshadows.com/tech/microsoft-surface.asp.

Microsoft Surface Web Page, downloaded from http://www.microsoft.com/surface/pp./Product/WhatIs.aspx on Sep. 24, 2009.

Experience Microsoft Surface, downloaded from http://www.microsoft.com/surface/Pages/Product/Specifications.aspx on Sep. 24, 2009.

Microsoft Surface, downloaded from http://en.wikipedia.org/wiki/Microsoft_surface on Sep. 24, 2009.

Mitsubishi DiamondTouch, http://www.merl.com/projects/DiamondTouch/, visited Mar. 21, 2007.

Mo, Zhenyao "SmartCanvas: A Gesture-Driven Intelligent Drawing Desk System," Jan. 9-12, 2005, Proceedings of Intelligent User Interfaces (IUI '05).

Morris, T. et al., "Real-Time Fingertip Detection for Hand Gesture Recognition," Sep. 9-11, 2002, Advanced Concepts for Intelligent Vision Systems (ACIVS '04), Ghent University, Belgium.

Observation by third party Petra Trefzger dated Jan. 17, 2005, cited during opposition of European Application No. 02739710.8, filed Jun. 4, 2002.

Observation by third party Michael Saup dated Jan. 17, 2005, cited during opposition of European Application No. 02739710.8, filed Jun. 4, 2002.

Ivars Peterson, "Artificial reality; combining a person's live video image with computer graphics suggests novel ways of working and playing with computers" Science News, Jun. 22, 1985.

The History of Microsoft Surface, downloaded from http://www.microsoft.com/presspass/presskits/surfacecomputing/docs/SurfaceHistoryBG.doc on Sep. 24, 2009.

Torr, P.H.S. et al., "The Development and Comparison of Robust Methods for Estimating the Fundamental Matrix," 1997, International Journal of Computer Vision, vol. 24, No. 3, pp. 271-300.

Wilson, Andrew, "PlayAnywhere: A Compact Interactive Tabletop Projection-Vision System," ACM Symposium on User Interface Software and Technology (UIST), 2005.

Written Opinion for PCT/US2002/017843, filed Jun. 4, 2002, dated Feb. 5, 2003.

Written Opinion of the International Searching Authority for PCT/US2008/059900, filed Apr. 10, 2008.

International Preliminary Report on Patentability for PCT/US2008/059900, filed on Apr. 10, 2008.

International Preliminary Report on Patentability for PCT/US2008/10750, filed Sep. 15, 2008.

Provision of a copy of the minutes in European Application No. 02739710.8 dated Dec. 28, 2009.

Decision revoking the European Patent in European Application No. 02739710.8 dated Dec. 28, 2009.

Summons to Attend Oral Proceedings in European Application No. 02739710.8, dated Jun. 12, 2009.

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Notice of Opposition in European Application No. 02739710.8 dated Aug. 23, 2010.

* cited by examiner

INTERACTIVE VIDEO DISPLAY SYSTEM

CROSS-REFERENCES TO RELATED APPLICATIONS

This application is a Divisional Application of commonly-owned patent application Ser. No. 10/160,217, filed on May 28, 2002 now U.S. Pat. No. 7,259,747, entitled "INTERACTIVE VIDEO DISPLAY SYSTEM", by Bell, which is incorporated herein by reference, which in turn claims priority from co-pending U.S. Provisional Patent Application No. 60/296,189 filed Jun. 5, 2001 entitled INTERACTIVE VIDEO DISPLAY SYSTEM THAT USES VIDEO INPUT which is hereby incorporated by reference, as if set forth in full in this document, for all purposes.

BACKGROUND OF THE INVENTION

The present invention relates in general to image processing systems and more specifically to a system for receiving and processing an image of a human user to allow interaction with video displays.

Image processing is used in many areas of analysis, education, commerce and entertainment. One aspect of image processing includes human-computer interaction by detecting human forms and movements to allow interaction with images. Applications of such processing can use efficient or entertaining ways of interacting with images to define digital shapes or other data, animate objects, create expressive forms, etc.

Detecting the position and movement of a human body is referred to as "motion capture." With motion capture techniques, mathematical descriptions of a human performer's movements are input to a computer or other processing system. Natural body movements can be used as inputs to the computer to study athletic movement, capture data for later playback or simulation, enhance analysis for medical purposes, etc.

Although motion capture provides benefits and advantages, motion capture techniques tend to be complex. Some techniques require the human actor to wear special suits with high-visibility points at several locations. Other approaches use radio-frequency or other types of emitters, multiple sensors and detectors, blue-screens, extensive post-processing, etc. Techniques that rely on simple visible-light image capture are usually not accurate enough to provide well-defined and precise motion capture.

Some motion capture applications allow an actor, or user, to interact with images that are created and displayed by a computer system. For example, an actor may stand in front of a large video screen projection of several objects. The actor can move, or otherwise generate, modify, and manipulate, the objects by using body movements. Different effects based on an actor's movements can be computed by the processing system and displayed on the display screen. For example, the computer system can track a path of the actor in front of the display screen and render an approximation, or artistic interpretation, of the path onto the display screen. The images with which the actor interacts can be e.g., on the floor, wall or other surface; suspended three-dimensionally in space, displayed on one or more monitors, projection screens or other devices. Any type of display device or technology can be used to present images with which a user can control or interact.

In some applications, such as point-of-sale, retail advertising, promotions, arcade entertainment sites, etc., it is desirable to capture the motion of an untrained user (e.g., a person passing by) in a very unobtrusive way. Ideally, the user will not need special preparation or training and the system will not use unduly expensive equipment. Also, the method and system used to motion capture the actor should, preferably, be invisible or undetectable to the user. Many real-world applications must work in environments where there are complex and changing background and foreground objects, short time intervals for the capture, changing lighting conditions and other factors that can make motion capture difficult.

BRIEF SUMMARY OF THE INVENTION

The present invention permits interaction between a user and a computer display system using the user's (or another object's) movement and position as input to a computer. The computer generates a display that responds to the user's position and movement. The generated display can include objects or shapes that can be moved, modified, or otherwise controlled by a user's body movements.

In a preferred embodiment of the invention, displayed images are affected by a user's actions in real-time. The display can be projected around the user so that that the user's actions create effects that emanate from the user and affect display areas proximate to the user. Or the user can affect video objects such as by kicking, pushing, moving, deforming, touching, etc., items in video images. Interference between light used to display interactive images and light used to detect the user is minimized by using light of substantially different wavelengths.

In one embodiment, a user is illuminated with infrared light that is not visible to the human eye. A camera that is sensitive to infrared light is used to capture an image of the user for position and motion analysis. Visible light is projected by a projector onto a screen, glass or other surface to display interactive images, objects, patterns or other shapes and effects. The display surface can be aligned around the user so that their physical presence within the display corresponds to their virtual presence, giving the experience of physically touching and interacting with virtual objects.

One aspect of the invention can use patterned illumination instead of a simple, non-visible, uniform "floodlight." With patterned illumination, a pattern, such as a checkerboard, random dot pattern, etc., is projected. The pattern is used by processes executing on a computer to interpret a camera image and to detect an object from a background and/or other items in a scene. The pattern can be generated as a background (so that it does not impinge upon an object to be detected) or the pattern can be projected over all of the camera's viewable scene so that it illuminates background, foreground and objects to be detected and motion captured.

One way to achieve the patterned illumination includes using an infrared LED cluster or other non-visible light source in a slide projector. Another approach could use an infrared laser beam that is deflected, shuttered, scanned, etc., to produce a pattern.

Another way to achieve the patterned illumination is to use a regular "floodlight", but mark the aforementioned pattern onto the camera's viewable area using ink, dye, or paint that is either dark or highly reflective in the camera's receptive frequency. This ink, dye, or paint can be made invisible to the human eye so as to improve the aesthetics of the display.

Another aspect of the invention uses a gradient approach to determine object-image interaction. An "influence image" is created by creating a gradient aura, or gray scale transition, around a detected object. As the detected object moves, the gradient aura is calculated in real time. As the gradient aura impinges upon a video image or item, the brightness and gradient in the region of the impinged item is calculated. The strength and direction of interaction (e.g., a pushing of the item) is a function of the brightness and gradient, respectively, of the impinged region.

In one embodiment the invention provides a system for detecting an object and generating a display in response, the system comprising a first source, for outputting electromagnetic energy in a first wavelength range, a detector for detecting a reflection of the first source of electromagnetic energy from an object, a processor coupled to the detector for using the detected reflection to generate a display signal, a second source, for outputting electromagnetic energy at a second wavelength range, wherein the second source generates a visible display in response to the display signal, wherein the first and second wavelength ranges are different.

In another embodiment the invention provides a method for detecting an object in an image captured with a camera, the method comprising using a patterned illumination to illuminate a background differently from the object; and using a processing system to define the object apart from the background.

In another embodiment the invention provides a method for computing an interaction of an object with a video item, the method comprising using a processor to determine a gradient for the object; using a processor to determine a boundary for the video item; and identifying an interaction by using the gradient and the boundary.

DETAILED DESCRIPTION OF THE INVENTION

Several configurations of the invention are described below. In general, the present invention uses a first light source to illuminate a user, or another object. The first light source uses light that is not visible to humans. For example, infrared or ultraviolet light can be used. A camera that is sensitive to light at the wavelength range of the first light source is used to detect a user who is illuminated by the first light source. A computer (or other processing system) is used to process the detected object image and to generate images for display. A second light source (e.g., a projector, video screen, etc.) is used to display the generated display images to a human user or viewers. The displayed images are at wavelengths that minimize interference with the camera's object detection. Typically, the visible spectrum is used to display the images.

In a preferred embodiment, the display surrounds the user such that the user's virtual presence is aligned with the user's physical presence. Thus, the virtual scene on the display has a physical location around the user, and the user's movement within the display will cause identical movement of the user's representation within the virtual scene. For example, the user can impinge on a virtual object's physical location and know that this will cause their virtual representation to touch the virtual object in the computer system. The use of the term "touch" or "touching" in this specification does not mean physical contact with an object, such as a person, and an image item. Rather the notion of touching means that the object's position and action in physical space is translated into an effect in a generated image, including effects of moving items in the generated images.

Displayed images or items can include objects, patterns, shapes or any visual pattern, effect, etc. Aspects of the invention can be used for applications such as interactive lighting effects for people at clubs or events, interactive advertising displays, characters and virtual objects that react to the movements of passers-by, interactive ambient lighting for public spaces such as restaurants, shopping malls, sports venues, retail stores, lobbies and parks, video game systems, and interactive informational displays. Other applications are possible and are within the scope of the invention.

Figure 1:
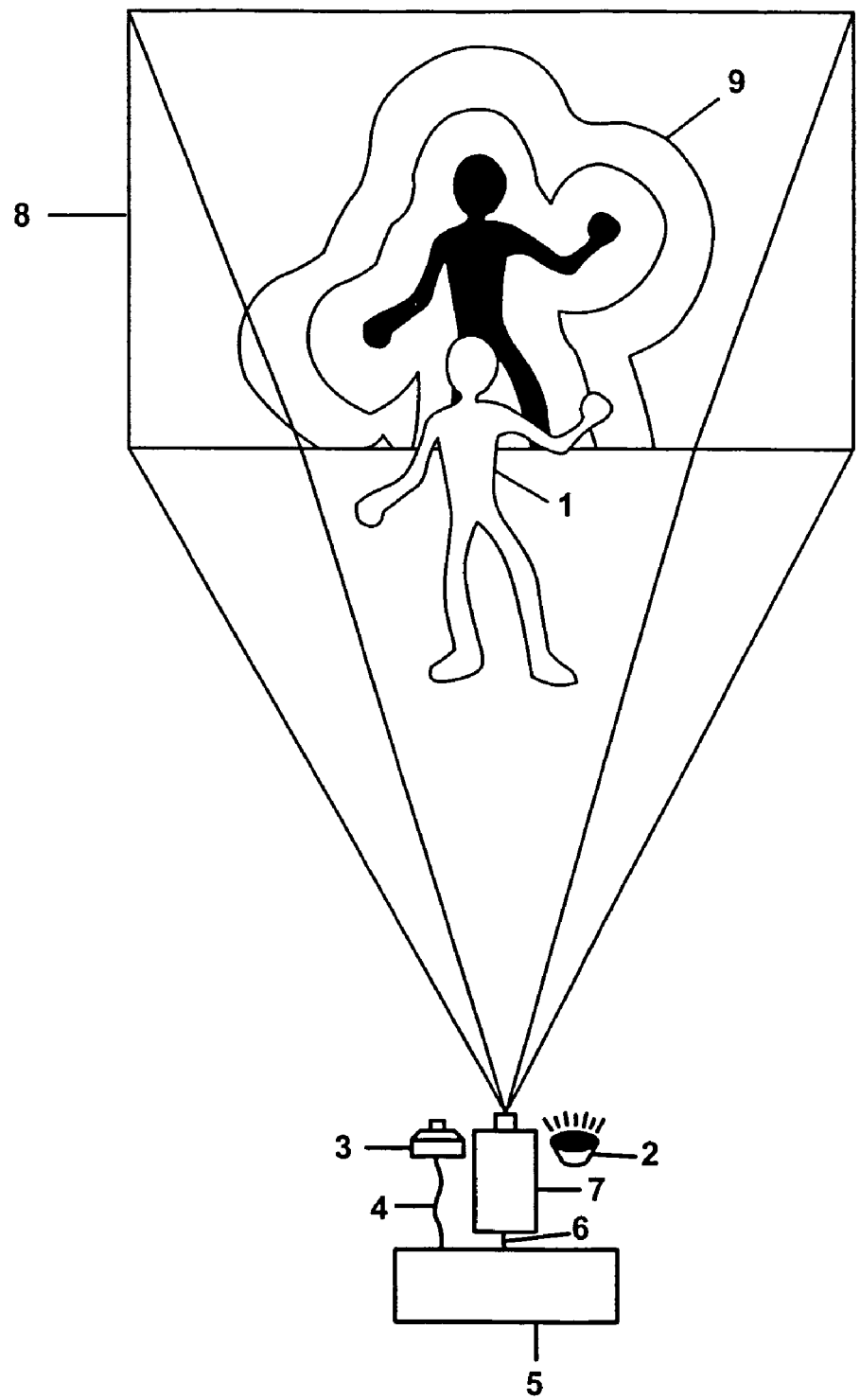
FIG. 1 shows a first configuration of a preferred embodiment using a co-located projector and camera.

FIG. 1 shows a front-projection embodiment of the invention using a co-located camera and projector. In FIG. 1, a person 1 is illuminated by an infrared (or other non-visible light) lamp 2. The image of the person is photographed by an infrared (or other non-visible light) camera 3. This signal is transmitted real-time 4 to computer 5. The computer performs the object detection algorithm, and generates the video effect in real time. The effect is transmitted 6 real-time to video projector 7. The projector projects the resulting image onto a screen 8 or some other surface. The video effect is then displayed 9 on the screen, in real time, and aligned with the person.

Figure 2:
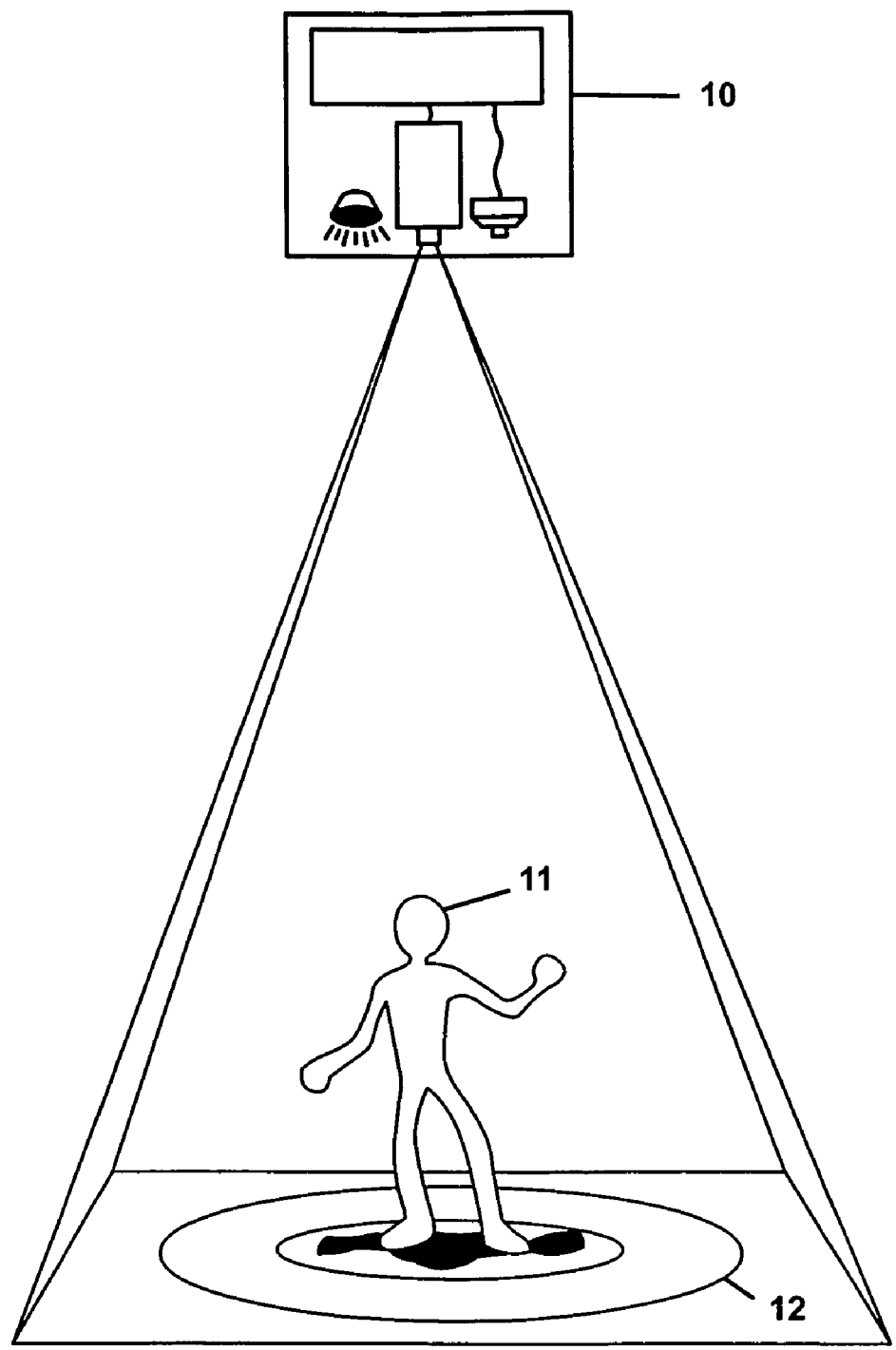
FIG. 2 shows an overhead projection configuration.

FIG. 2 shows an overhead projection configuration of the system. Component 10 includes the aforementioned system. Component 10 is shown mounted vertically here, but the camera, projector, and light source within 10 can also be mounted horizontally and then redirected downwards with a mirror. A person moving on the ground 11 can have the video signal projected onto the ground around them 12. The person's own shadow obscures a minimal amount of the image when the projector is directly overhead.

Figure 3:
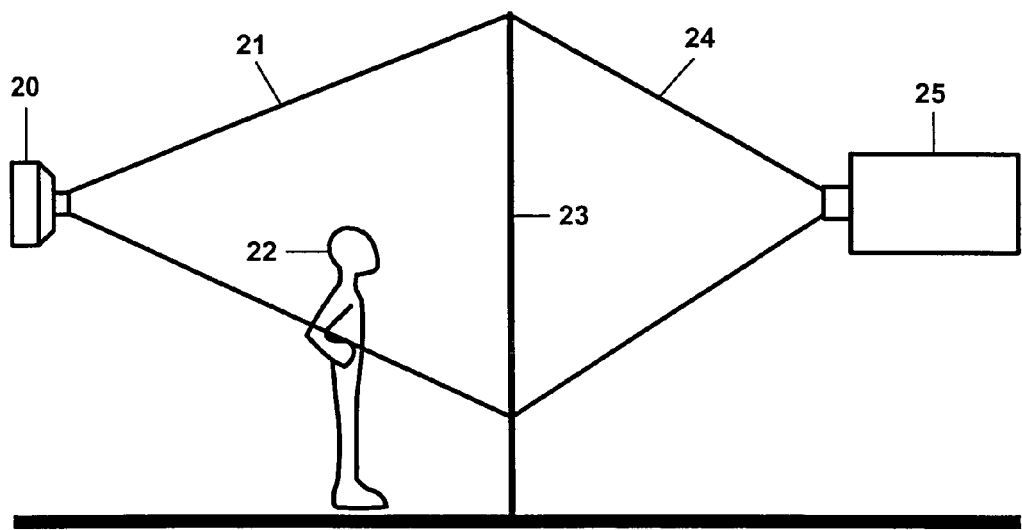
FIG. 3 shows a rear-projection configuration.
Figure 4:
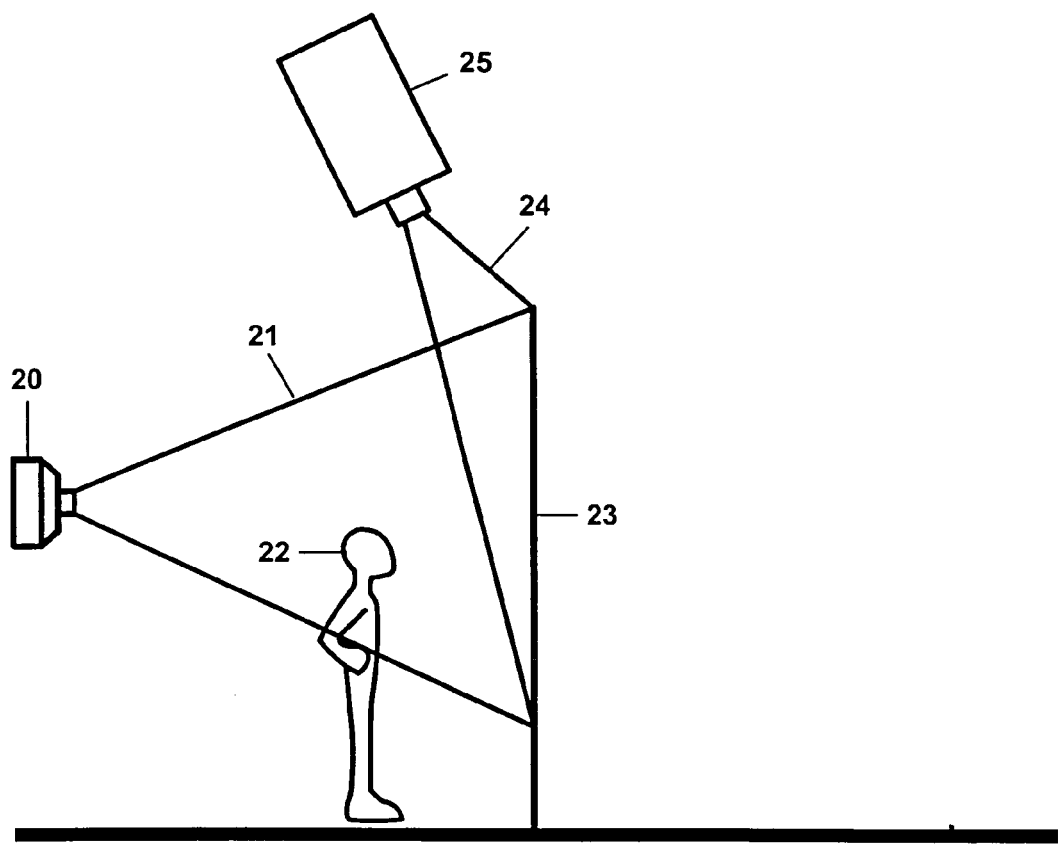
FIG. 4 shows a side-projection configuration.

FIGS. 3 and 4 show two more alternate configurations for the camera and projector. In both figures, camera 20 captures objects such as a person 22 in front of a screen 23. The angle viewed by the camera is shown at 21. In FIG. 3 projector 25 is placed behind the screen. The cast light from projector 24 can be seen on the screen from both sides. In FIG. 4, projector 25 is at an oblique angle to the screen; its light cone 24 is shown. Both of these configurations make it more likely that there are no shadows obstructing the projected image.

As described in the configurations, above, a video camera is used to capture the scene at a particular location for input into the computer. In most configurations of the device, the camera views part of the output video display. To prevent unwanted video feedback, the camera can operate at a wavelength that is not used by the video display. In most cases, the display will use the visible light spectrum. In this case, the camera must photograph in a non-visible wavelength, such as infrared, so that the video display output is not detected.

The scene being videotaped must be illuminated in light of the camera's wavelength. In the case of infrared, sources including sunlight, a heat lamp or infrared LEDs can be used to illuminate the scene. These lights can be positioned anywhere; however, the camera's view of spurious shadows from these lights can be minimized by placing the light source in proximity to the camera. A light source, such as one or more lights, can illuminate objects with a uniform lighting, as opposed to the patterned illumination discussed, below. In a preferred embodiment, the video signal is exported in real-time to the computer. However, other embodiments need not achieve real-time or near-real-time and can process object or video images (i.e., display images) at times considerably prior to displaying the images.

This component is designed to be modular; any computer software that utilizes the video input from the previous component and outputs the results to a video display can be used here.

Most instances of this component will have two parts: the first part handles the detection of mobile objects from static background, while the second part utilizes the object information to generate a video output. Numerous instances of each part will be described here; these instances are simply meant to be examples, and are by no means exhaustive.

In the first part, the live image from the video camera is processed real-time in order to separate mobile objects (e.g. people) from the static background, regardless of what the background is. The processing can be done as follows:

First, input frames from the video camera are converted to grayscale to reduce the amount of data and to simplify the detection process. Next, they may be blurred slightly to reduce noise.

Any object that does not move over a long period of time is presumed to be background; therefore, the system is able to eventually adapt to changing lighting or background conditions. A model image of the background can be generated by numerous methods, each of which examines the input frames over a range of time. In one method, the last several input frames (or a subset thereof) are examined to generate a model of the background, either through averaging, generating the median, detecting periods of constant brightness, or other heuristics. The length of time over which the input frames are examined determines the rate at which the model of the background adapts to changes in the input image.

In another method, the background model is generated at each time step (or more infrequently) by computing a weighted average of the current frame and the background model from the previous time step. The weight of the current frame is relatively small in this calculation; thus, changes in the real background are gradually assimilated into the background model. This weight can be tuned to change the rate at which the background model adapts to changes in the input image.

An object of interest is presumed to differ in brightness from the background. In order to find objects at each time step, the current video input is subtracted from the model image of the background. If the absolute value of this difference at a particular location is larger than a particular threshold, then that location is classified as an object; otherwise, it is classified as background.

The second part can be any program that takes the object/background classification of an image (possibly in addition to other data) as input, and outputs a video image based on this input, possibly in real time. This program can take on an infinite number of forms, and is thus as broadly defined as a computer application. For example, this component could be as simple as producing a spotlight in the shape of the detected objects, or as complicated as a paint program controlled through gestures made by people who are detected as objects. In addition, applications could use other forms of input, such as sound, temperature, keyboard input etc. as well as additional forms of output, such as audio, tactile, virtual reality, aromatic, etc.

One major class of applications includes special effects that use the object/background classification as input. For example, stars, lines, or other shapes could be drawn in the output video image in a random portion of the locations that were classified as "object". These shapes could then be set to gradually fade away over time, so that people leave transient trails of shapes behind them as they move around. The following are examples of other effects in the same class:

contours and ripples surrounding the objects a grid which is deformed by the presence of objects simulations of flame and wind, and other matrix convolutions applied to objects special effects that pulse to the beat of the music, which is detected separately Another major class of applications allows the real objects to interact with virtual objects and characters. For example, an image showing a group of ducklings could be programmed to follow behind any real object (e.g. a person) that walks in front of the display.

In addition, computer games that can be played by people moving in front of the camera form another class of applications.

However, this list is not exclusive; this component is designed to be programmable, and thus can run any application.

The output of the processing software from the previous component is displayed visually. Possible displays include, but are not limited to video projectors, televisions, plasma displays, and laser shows. The displayed image can be aligned with the video camera's input range so that the video effects align with the locations of the people causing them. Since some configurations of the video camera can detect objects in non-visible light, the problem of the display interfering with the camera is avoided.

There are numerous possible configurations for the different components. For example, the camera and a video projector can be in the same location and pointed in the same direction. The camera and projector can then be pointed at a wall as shown in FIG. 1, pointed at the ground, redirected with a mirror as shown in FIG. 2, or pointed at any other surface. Alternatively, the projector could be placed behind the screen as shown in FIG. 3 so that the display is identical to the one in FIG. 1, but the person is no longer in the way of the projection, so they do not cast a shadow. The shadow could also be avoided by placing the projector at an oblique angle to the screen as shown in FIG. 4. The video display could also be a large-screen TV, plasma display, or video wall. While the aforementioned configurations all have the video display lined up with the video input, this is not necessary; the video display could be placed anywhere. The preceding list is not exhaustive; there are numerous additional possible configurations.

The overall system can be networked, allowing vision information and processing software state information to be exchanged between systems. Thus an object detected in the vision signal of one system can affect the processing software in another system. In addition, a virtual item in the display of one system could move to other systems. If the displays of multiple systems are aligned together so that they form a single larger display, then the multiple systems can be made to function as if they were a single very large system, with objects and interactions moving seamlessly across display boundaries.

One common problem with the vision system is that, in cases where there is uncontrollable ambient illumination (e.g. sunlight) of the camera's viewable area from a significantly different angle than the camera, objects cast shadows onto the background. If these shadows are strong enough, the vision system may mistake them for objects. These shadows can be detected and removed by strobing the camera's light source. By subtracting a camera input image with ambient light alone from a camera input image with both the ambient light and the camera's light, the system yields an image that captures the scene as if only the camera's light were being used, thus eliminating the detectable shadows from the ambient light.

Additional accuracy in detecting objects with the images captured by the camera can be obtained by using patterned illumination or patterned markings.

One shortcoming of using a simple floodlight illumination system for computer vision is that if the colors of objects being viewed by the camera are very similar, then the objects can be very difficult to detect. If the camera operates in monochrome it is much more likely for the object and background to look the same.

Using a patterned object to cover camera's viewable area can improve object detection. If a pattern that contains two or more colors intermingled in close proximity is used, it is highly unlikely that other objects will have a similar look since at least one color of the pattern will look different from the color of surrounding objects. If a patterned object, such as a screen, is used as a background before which are the objects to be detected, then objects that pass in front of the patterned screen are more easily detected by the vision algorithm.

For example, in an infrared vision application the patterned object could be a background mat that appears white to the human eye, but contains a light & dark checkered pattern that is invisible to the human eye but visible to the camera. By using a pattern that is not in the visible light spectrum, the patterned mat will not interfere with the aesthetics of the system. The display system (e.g., projection video) can project output images onto the mat, as described above. A process executing on a processing system such as a computer system can be provided with the background pattern, thus making detection of an object in front of the mat easier, although the system could learn the patterned background in the same way that the vision algorithm learns any other background. Also, the ability of the system to adapt to changes in background light brightness would not be adversely affected.

A patterned illumination can also be projected from a light source onto the camera's viewable area. As long as the camera and invisible light source are in different, offset locations, parallax effects will cause the camera's view of the projected pattern to be distorted as objects move through the camera's viewing area. This distortion helps make objects that have similar colors stand out from each other. If the difference between the two images seen by the camera is taken, the result will show the shape of any object that has appeared, disappeared, or moved between the two images. If the image of an object in front of the background is subtracted from an image of the background alone, the result is an image that is zero where there is background and nonzero where there are other objects. This technique can be used in combination with other aspects of the invention discussed, herein.

A patterned light source can be achieved through several means. One method is to use an infrared light-emitting diode (LED) cluster or another non-visible light source in a slide projector. A set of lenses would be used to focus the light source through a slide containing the desired pattern, thus casting the pattern's image onto the camera's viewing area. In another method, an infrared laser beam could be shined onto a laser pattern generator or other scattering device in order to produce a light pattern on the camera's viewing area. Light can be deflected, shuttered, scanned, etc., in order to achieve a pattern. Many other approaches are possible.

A patterned light source is also useful for 3-D computer vision. 3-D computer vision techniques such as the Marr-Poggio algorithm take as input two images of the same scene taken from slightly different angles. The patterns on the images are matched up to determine the amount of displacement, and hence the distance from the camera, at each point in the image. The performance of this algorithm degrades when dealing with objects of uniform color because uniform color makes it difficult to match up the corresponding sections in the image pair. Thus, the patterned light source can improve the distance estimates of some 3D computer vision algorithms.

The two input images to these 3-D vision algorithms are usually generated using a pair of cameras pointed at the scene. However, it would also be possible to use only one camera. The second image could be an entirely undistorted version of the projected pattern, which is known ahead of time. This image of the pattern is essentially identical to what a second camera would see if it were placed at the exact same location as the patterned light source. Thus, the single camera's view and the projected pattern together could be used as an input to the 3-D vision algorithm. Alternatively, the second image could be an image of the background alone, taken from the same camera.

While many different kinds of patterns can be used, a high-resolution random dot pattern has certain advantages for both 2-D and 3-D vision. Due to the randomness of the dot pattern, each significantly sized section of the dot pattern is highly unlikely to look like any other section of the pattern. Thus, the displaced pattern caused by the presence of an object in the viewing area is highly unlikely to look similar to the pattern without the object there. This maximizes the ability of the vision algorithm to detect displacements in the pattern, and therefore objects. Using a regular pattern such as a grid can cause some difficulty because different sections of the pattern are identical, causing the displaced pattern to often look like the non-displaced pattern.

Figure 5D:
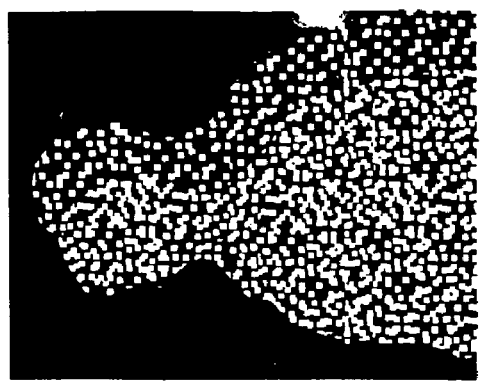
FIG. 5D shows a result of detecting a subject from a background using random dot pattern illumination.
Figure 5C:
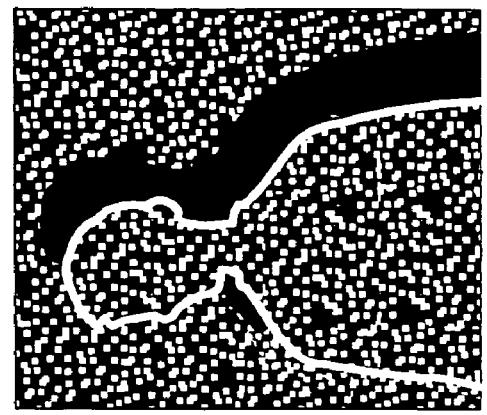
FIG. 5C illustrates a subject and background under random dot pattern illumination.
Figure 5B:
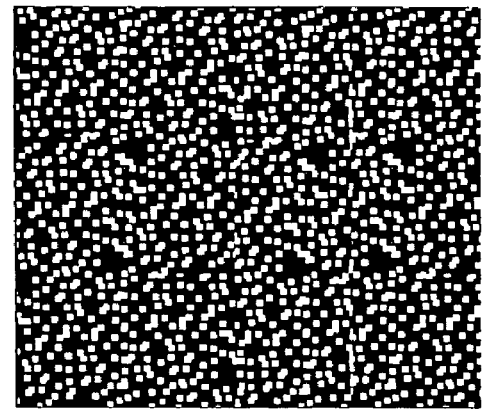
FIG. 5B illustrates a background under random dot pattern illumination.
Figure 5A:
FIG. 5A illustrates a subject under uniform illumination.

FIGS. 5A-D show the usefulness of a random dot pattern in detecting an object. FIG. 5A shows a picture of a person under normal illumination. The person has a similar brightness to the background, making detection difficult. In FIG. 5B, a random dot pattern is projected onto the background from a light source near the camera. When the person stands in front of this pattern, the pattern reflected off of the person is displaced, as shown in FIG. 5C. By taking the difference between the images in FIGS. 5B and 5C, the image of FIG. 5D is obtained which defines the image area of the person with a strong signal.

Other approaches can be used to improve object detection. For example, a light source can be "strobed" or turned on-and-off periodically so that detection of shadows due to other light sources (e.g., ambient light) is made easier.

Once an object has been detected and defined the preferred embodiment uses a gradient aura to determine degree and direction of interaction of the object with a displayed image item.

Figure 6A:
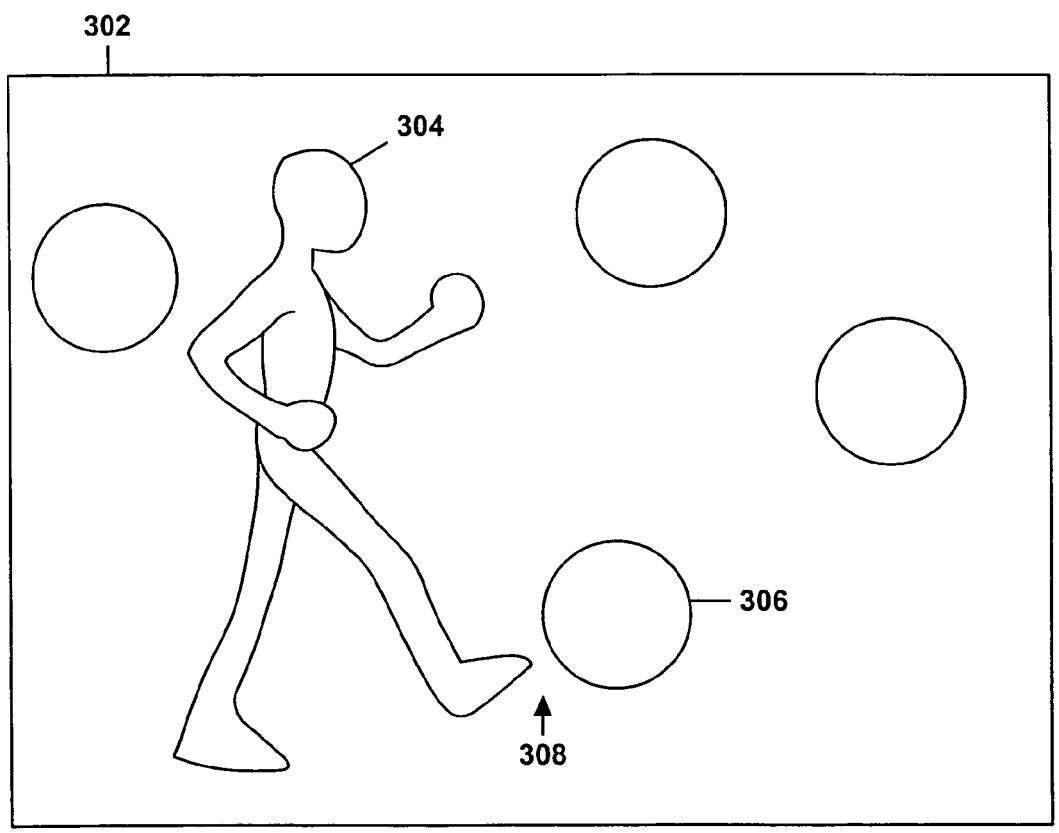
FIG. 6A shows a human user interacting with a video object.

FIG. 6A shows a human user interacting with a video object.

In FIG. 6A, object 304 has been detected and is shown in outline form. One representation of the object within a computer's processing can use the outline definition depicted in FIG. 6A. Video screen 302 displays several image items, such as image 306 of a ball.

Figure 6B:
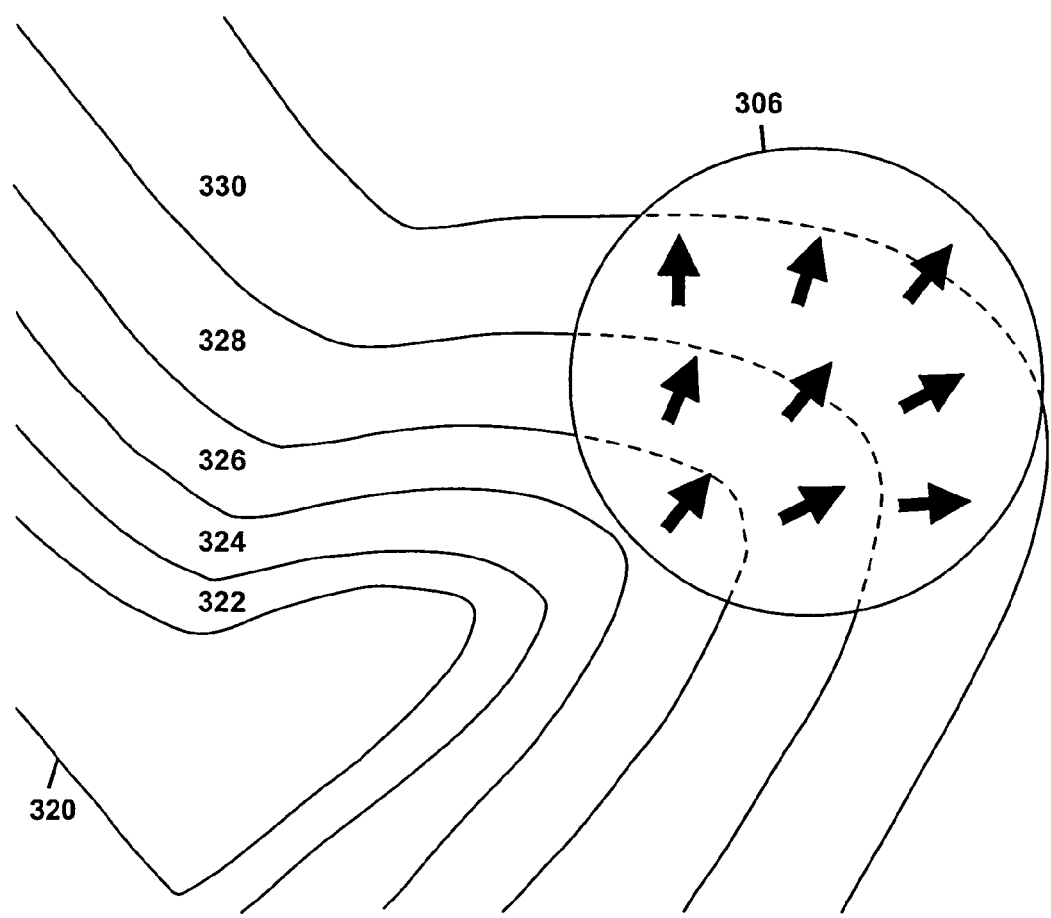
FIG. 6B illustrates an influence image.

FIG. 6B illustrates an influence image for the region of 308 of FIG. 6A.

In FIG. 6B, the outline image of the user's foot 320 and lower leg are used to generate successively larger outline areas. The original outline area 320's region is assigned a large pixel brightness value corresponding to white. Each successive outline area, 322, 324, 326, 328, 330 is assigned a progressively lower value so that a point farther away from the initial outline (white) area will have a lower pixel value. Note that any number of outline areas can be used. Also, the size and increments of outline areas can vary, as desired. For example, it is possible to use a continuous gradient, rather than discrete areas. The collection of all outline areas is referred to as the "influence image."

The influence image is compared to different image items. In FIG. 6B, ball item 306 impinges upon gradient areas 326, 328 and 330. As is known in the art, direction lines are determined in the direction of the gradient of the pixel value field for the impinged areas. FIG. 6B shows three example direction lines within item 306. The direction lines can be combined, e.g., by averaging, or a select single line can be used. The processing also detects that the brightest outline area impinged by the item is outline area 326. Other approaches are possible. For example, the brightness and gradient can be averaged over every point in the area of the image item, or on a subset of those points. Also, some embodiments can include duration of contact as a factor in addition to the brightness and gradient.

The interaction between an object, such as a person, and an item on the screen is computed using both the brightness of impinged outline areas and the direction as computed using one or more direction lines. The impinged brightness corresponds to the strength with which the user is "touching" the item. The gradient corresponds to the direction in (or from, depending on the sign of the calculation) which the item is being touched.

Although the invention has been discussed with reference to specific embodiments thereof, these embodiments are illustrative, not restrictive, of the invention. For example, although the preferred embodiments use a camera as a detector, different types of detection devices can be employed. The camera can be digital or analog. A stereo camera could be used in order to provide depth information as well as position. In cases where processing and display are not done in real time, film and other types of media can be used and followed up by a digital conversion before inputting the data to a processor. Light sensors or detectors can be used. For example, an array of photodetectors can be used in place of a camera. Other detectors not contemplated herein can be used with suitable results.

In general, any type of display device can be used with the present invention. For example, although video devices have been described in the various embodiments and configurations, other types of visual presentation devices can be used. A light-emitting diode (LED) array, organic LED (OLED), light-emitting polymer (LEP), electromagnetic, cathode ray, plasma, mechanical or other display system can be employed.

Virtual reality, three-dimensional or other types of displays can be employed. For example, a user can wear imaging goggles or a hood so that they are immersed within a generated surrounding. In this approach, the generated display can align with the user's perception of their surroundings to create an augmented, or enhanced, reality. One embodiment may allow a user to interact with an image of a character. The character can be computer generated, played by a human actor, etc. The character can react to the user's actions and body position. Interactions can include speech, co-manipulation of objects, etc.

Multiple systems can be interconnected via, e.g., a digital network. For example, Ethernet, Universal Serial Bus (USB), IEEE 1394 (Firewire), etc., can be used. Wireless communication links such as defined by 802.11b, etc., can be employed. By using multiple systems, users in different geographic locations can cooperate, compete, or otherwise interact with each other through generated images. Images generated by two or more systems can be "tiled" together, or otherwise combined to produce conglomerate displays.

Other types of illumination, as opposed to light, can be used. For example, radar signals, microwave or other electromagnetic waves can be used to advantage in situations where an object to detect (e.g., a metal object) is highly reflective of such waves. It is possible to adapt aspects of the system to other forms of detection such as by using acoustic waves in air or water.

Although computer systems have been described to receive and process the object image signals and to generate display signals, any other type of processing system can be used. For example, a processing system that does not use a general-purpose computer can be employed. Processing systems using designs based upon custom or semi-custom circuitry or chips, application specific integrated circuits (ASICs), field-programmable gate arrays (FPGAs), multiprocessor, asynchronous or any type of architecture design or methodology can be suitable for use with the present invention.

Thus, the scope of the invention is to be determined solely by the appended claims.

What is claimed is:

1. A method of tracking movement of an object, the method configured for execution by a computing system comprising one or more computing devices, the method comprising:
   receiving at a computing system a plurality of images from an image acquisition device;
   identifying an object of interest in at least one of the plurality of images;
   generating an influence image comprising one or more outline areas that each at least partially surround the identified object, wherein each of the outline areas are positioned successively further away from the identified object;
   mapping the at least one of the images, including the influence image, onto a video image depicting a virtual object; and
   based at least on an overlap between one or more of the outline areas of the influence image and the virtual object, determining an interaction between the object and the virtual object.

2. The method of claim 1, wherein the object of interest comprises at least a portion of a human.

3. The method of claim 1, wherein the interaction is selected from the group comprising pushing the virtual object, touching the virtual object, deforming the virtual object, or manipulating the virtual object.

4. The method of claim 1, further comprising:
   generating a combined video image comprising a representation of the object of interest and the virtual object; and
   projecting the combined video image onto a surface.

5. The method of claim 4, wherein the image acquisition device comprises a video recording device that is sensitive to light that is substantially not visible to humans.

6. A tangible computer readable storage medium having computer-executable instructions stored thereon, the computer-executable instructions readable by a computing system comprising one or more computing devices, wherein the computer-executable instructions are executable on the computing system in order to cause the computing system to perform a method of tracking movement of an object by a computing system comprising:
   receiving at a computing system a plurality of images from an image acquisition device;

identifying an object of interest in at least one of the plurality of images;

generating an influence image comprising one or more outline areas that each at least partially surround the identified object, wherein each of the outline areas are positioned successively further away from the identified object;

mapping the at least one of the images, including the influence image, onto a video image depicting a virtual object;

based at least on an overlap between one or more of the outline areas of the influence image and the virtual object, determining an interaction between the object and the virtual object.

7. The tangible computer readable storage medium of claim 6, wherein the method further comprises:

generating a combined video image comprising a representation of the object of interest and the virtual object; and projecting the combined video image onto a surface.

8. A system comprising:

a camera system operable to provide images of an object against a background;

a display system operable to render video images onto a surface, wherein the video images comprise at least one virtual object; and a computing device configured to control rendering of the video images; and generate an influence image comprising two or more outline areas that each at least partially surround the object, wherein each of the outline areas are positioned successively further away from the object, wherein the outline areas are usable to estimate an interaction with at least one virtual object.

9. The system of claim 8, wherein the computing device is further configured to receive images from the camera system, automatically adapt to changes in the background by repeatedly analyzing changes over time in the images from the camera system, control rendering of the video images in response to adaptations to changes in the background, and to adapt to changes in the background by generating an adaptive model of the background by analyzing changes over time in images from the camera system.

10. The system of claim 8, wherein the computing device is further configured to assign a brightness value to each of the outline areas so that the brightness values of the outline areas decrease as the outline areas are positioned farther away from the object.

11. The system of claim 10, wherein the computing device is further configured to determine an interaction between the object and the at least one virtual object based on one or more of the brightness values associated with the outline areas.

12. The system of claim 11, wherein the interaction includes the object pushing the at least one virtual object.

13. The system of claim 11, wherein the interaction includes the object touching the at least one virtual object.

14. The system of claim 11, wherein the interaction includes the object deforming the at least one virtual object.

15. The system of claim 11 wherein the interaction includes the object manipulating the at least one virtual object.

16. The system of claim 8, wherein the camera system includes a strobed light source.

17. The system of claim 16, wherein the computing device is further configured to process the images from the camera system based on at least the strobed light source.

18. The system of claim 17, wherein the computing device is further configured to suppress a lighting phenomenon due to sources of light other than the camera system light source.

19. The system of claim 17, wherein the computing device is further configured to adapt to shadows due to sources of light other than the camera system light source.

20. The system of claim 9, wherein the computing device is further configured to generate the adaptive model of the background by identifying pixels in the image having a substantially constant brightness over time.

21. The system of claim 9, wherein the computing device is further configured to generate the adaptive model of the background by computing median values over time for the pixels.

22. The system of claim 9, wherein the computing device is further configured to generate the adaptive model of the background by computing median values over time for pixels in the images.

23. The system of claim 9, wherein the computing device is further configured to generate the adaptive model of the background by incorporating the background changes in the background into the adaptive model over time.

24. The system of claim 9, wherein the computing device is further configured to generate the adaptive model of the background by incorporating the background changes in the background that occur due to changes in lighting into the adaptive model.

25. The system of claim 9, wherein the computing device is further configured to classify pixels of the images as one of foreground pixels and background pixels by comparing the images to the adaptive model.

26. The system of claim 9, wherein the computing device is further configured to generate the adaptive model of the background by incorporating the background information relating to at least a portion of the images that has remained substantially stationary for a period of time into the adaptive model.

27. The system of claim 9, wherein the computing device is further configured to generate the adaptive model of the background by computing a weighted average of a current image of the image from the camera system with the adaptive model of the background.

28. The system of claim 27, wherein the computing device is further configured to tune the weighted average to change a rate at which the model of the background adapts to changes in the images from the camera system.

29. The system of claim 9, wherein the computing device is further configured to generate the display item by distinguishing between foreground that corresponds to the object and the background.

30. The system of claim 29, wherein the distinguishing comprises comparing a current image of the images from the camera system with the adaptive model of the background.

31. The system of claim 30, wherein the distinguishing further comprises determining if differences between corresponding pixels in the current image of the images from the camera system and the adaptive model of the background are greater than a threshold to determine a location of the object.

32. The system of claim 8, wherein the camera system comprises two cameras to provide a stereo image, and wherein the computing device is further configured to compute depth data based on the stereo image and to use the depth data to generate the model of the background.

* * * * *

UNITED STATES PATENT AND TRADEMARK OFFICE
CERTIFICATE OF CORRECTION

| | | |
|---|---|---|
| PATENT NO. | : 7,834,846 B1 | Page 1 of 2 |
| APPLICATION NO. | : 11/507976 | |
| DATED | : November 16, 2010 | |
| INVENTOR(S) | : Bell | |

It is certified that error appears in the above-identified patent and that said Letters Patent is hereby corrected as shown below:

Page 2, item (56), under "U.S. Patent Documents", in Column 1, Line 10, delete "Yang" and insert -- Yang et al. --.

Page 2, item (56), under "U.S. Patent Documents", in Column 1, Line 17, delete "Kanada et al." and insert -- Kanade et al. --.

Page 3, item (56), under "Other Publications", in Column 1, Line 29, delete "D'India" and insert -- D'India, --.

Page 3, item (56), under "Other Publications", in Column 1, Line 38, delete "<emid" and insert -- &Itemid --.

Page 3, item (56), under "Other Publications", in Column 1, Line 48, delete "index/php?" and insert -- index.php? --.

Page 3, item (56), under "Other Publications", in Column 2, Line 48, delete "Information:"" and insert -- Information;" --.

Page 5, item (56), under "Other Publications", in Column 1, Line 22, delete "<http://http://" and insert -- <http:// --.

Page 5, item (56), under "Other Publications", in Column 1, Line 25, delete "<http://http://" and insert -- <http:// --.

Page 5, item (56), under "Other Publications", in Column 1, Line 55, delete "IEE" and insert -- IEEE --.

Page 5, item (56), under "Other Publications", in Column 2, Line 26, delete "(ICVVS '03)," and insert -- (ICVS '03), --.

Signed and Sealed this
Nineteenth Day of July, 2011

David J. Kappos
*Director of the United States Patent and Trademark Office*

CERTIFICATE OF CORRECTION (continued)

U.S. Pat. No. 7,834,846 B1

Sheet 5 of 7, Figure 5B, Line 1 (Figure Number), delete "Fig. 5 B" and insert -- Fig. 5B --.

Column 6, line 12, delete "separately" and insert -- separately. --.

Column 8, line 9, delete "3D" and insert -- 3-D --.

Column 11, line 28, in Claim 8, delete "to" and insert -- to: --.

Column 11, line 61, in Claim 15, delete "claim 11" and insert -- claim 11, --.